US012044304B2

(12) United States Patent
Knapke et al.

(10) Patent No.: US 12,044,304 B2
(45) Date of Patent: *Jul. 23, 2024

(54) DIFFERENTIAL WITH LUBRICATION PORTS

(71) Applicant: Dana Heavy Vehicle Systems Group, LLC, Maumee, OH (US)

(72) Inventors: Brian V. Knapke, Maumee, OH (US); Ned W. Wright, Toledo, OH (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/934,464

(22) Filed: Sep. 22, 2022

(65) Prior Publication Data

US 2023/0020321 A1 Jan. 19, 2023

Related U.S. Application Data

(63) Continuation of application No. 17/242,074, filed on Apr. 27, 2021, now Pat. No. 11,486,490.

(51) Int. Cl.
*F16H 57/04* (2010.01)
*F16H 48/10* (2012.01)
*F16H 57/037* (2012.01)

(52) U.S. Cl.
CPC ......... *F16H 57/0483* (2013.01); *F16H 48/10* (2013.01); *F16H 57/037* (2013.01); *F16H 57/0424* (2013.01)

(58) Field of Classification Search
CPC ............... F16H 57/0483; F16H 57/037; F16H 57/0424; F16H 48/10
USPC ........................................................ 475/160
See application file for complete search history.

(56) References Cited

U.S. PATENT DOCUMENTS

| | | |
|---|---|---|
| 3,292,456 A | 12/1966 | Saari |
| 5,122,101 A | 6/1992 | Tseng |
| 5,125,284 A * | 6/1992 | Carriere ............... F16H 57/037 475/198 |
| 5,310,389 A * | 5/1994 | Sato ....................... F16H 55/08 74/462 |
| 5,415,601 A | 5/1995 | Cilano |
| 5,713,813 A | 2/1998 | von Greyerz |
| 5,728,024 A | 3/1998 | Ishizuka et al. |
| 5,882,272 A * | 3/1999 | Allonby ................. F16H 48/34 475/86 |
| 6,402,656 B1 | 6/2002 | Peralta |
| 7,029,415 B2 | 4/2006 | Yamazaki et al. |
| 8,133,146 B2 | 3/2012 | Radzevich et al. |

* cited by examiner

*Primary Examiner* — Colby M Hansen
(74) *Attorney, Agent, or Firm* — McCoy Russell LLP

(57) ABSTRACT

Systems for a differential are provided. The differential includes two sets of pinion gears with an asymmetric split tooth profile. A case of the differential includes a plurality of lubrication ports which open adjacent to untoothed sections of one set of pinion gears and in a drive mode and an outboard axial load is exerted on the corresponding set of pinion gears.

18 Claims, 6 Drawing Sheets

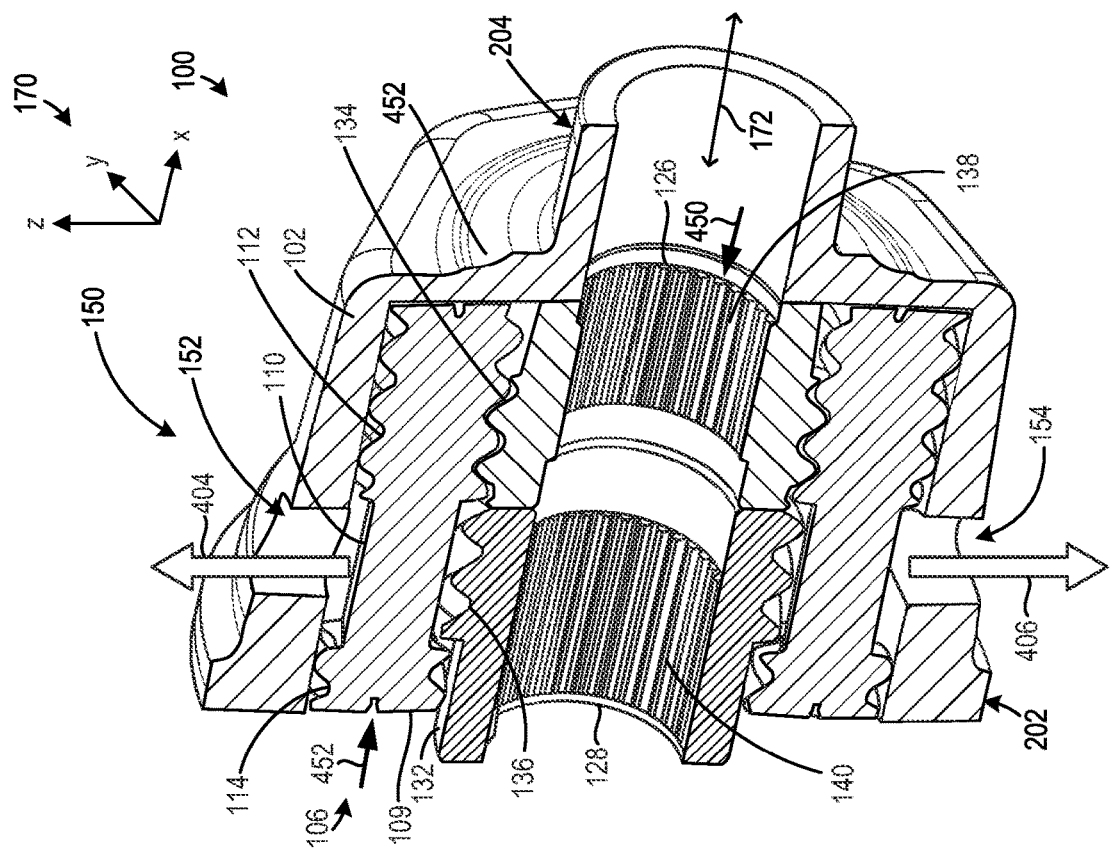
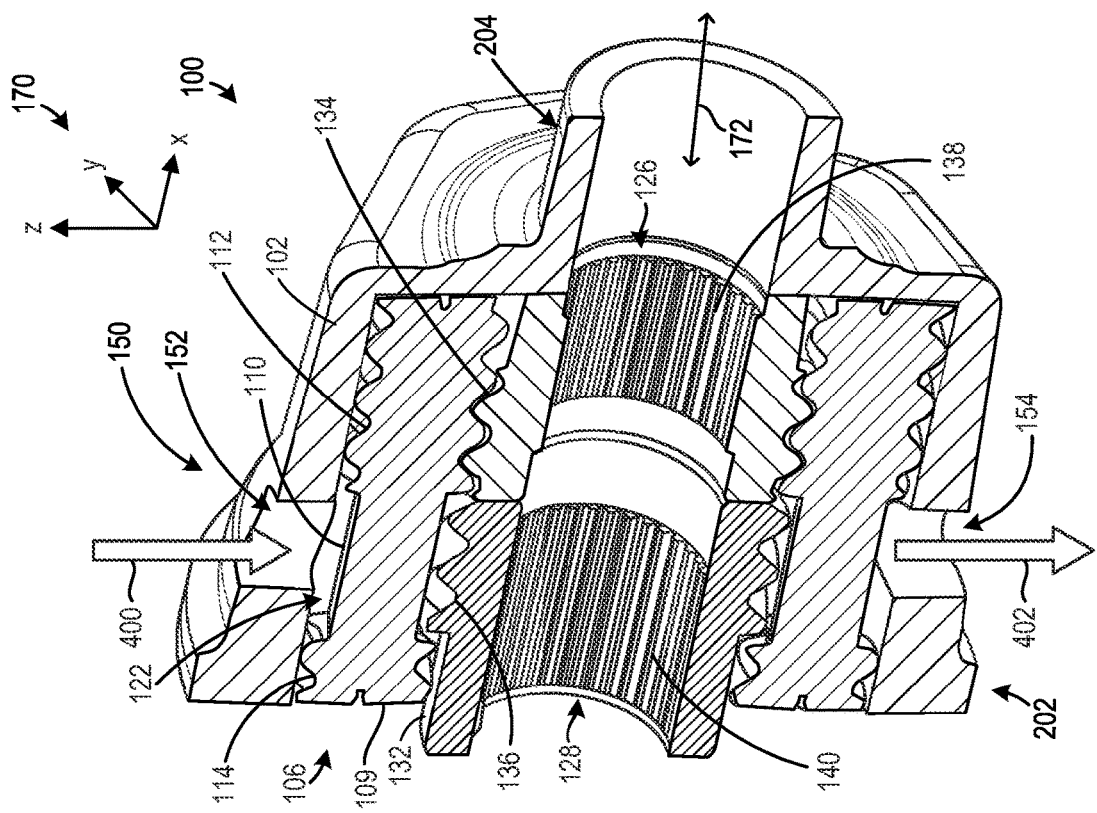

DIFFERENTIAL WITH LUBRICATION PORTS

CROSS REFERENCE TO RELATED APPLICATION

The present application is a continuation of U.S. Non-Provisional patent application Ser. No. 17/242,074, entitled "DIFFERENTIAL WITH LUBRICATION PORTS", and filed on Apr. 27, 2021. The entire contents of the above-listed application are hereby incorporated by reference for all purposes.

TECHNICAL FIELD

The present description relates generally to a differential in a vehicle. More particularly, the present disclosure relates to a differential with lubricant distribution features.

Background & Summary

Vehicle differentials, such as open differentials, permit speed differentiation between axle shafts which deliver power to drive wheels. Wheel slip during vehicle cornering is avoided when speed differentiation between the axle shafts is permitted. However, in low traction environments, the open differential permits the drive wheel with a lower friction coefficient to rotate at a higher speed than the opposing wheel, resulting in wheel slip.

A desire to increase vehicle traction led to the development of limited slip differentials. This limited slip functionality allows the deviation between axle shaft speeds to be constrained to reduce the chance of wheel slip. To alter handling performance under variable traction conditions, these limited slip differentials may transfer a greater amount of torque to the drive wheel with less traction. One example limited slip differential is shown by Yamazaki et al. in U.S. Pat. No. 7,029,415 B2. Yamazaki teaches a differential with a case and a plurality of pinion gears that mesh with a pair of side gears. Yamazaki further provides a lubricant hole in the case in an attempt to direct oil to the gears housed therein.

The inventors herein have recognized potential issues with Yamazaki's limited slip differential and other differential systems. As one example, the pinion gears disclosed by Yamazaki may exhibit unbalanced gear meshing due to the asymmetric tooth arrangement of the gears, leading to uneven wear amongst the gears. Further, the single lubrication hole in Yamazaki's differential may not achieve balanced lubricant distribution within a differential case and may be unable to flow desired amounts of lubricant to targeted regions that experience higher loads, for example. The potential for uneven wear of the differential components is consequently increased, thereby decreasing the differential's lifespan.

To overcome at least some of the aforementioned challenges, a differential is provided. In one example, the differential comprises two sets of pinion gears. Each of the gears in each set of pinions includes an untoothed section positioned between a wider toothed section and a narrower toothed section. The differential further includes a first side gear that meshes with the wider toothed sections of the first set of pinion gears. Still further, the differential includes a second side gear that meshes with the wider toothed sections of the second set of pinion gears. The differential further includes a case that comprises a lubrication port. The lubrication port opens radially adjacent to one of the pinion gears in the first set of pinion gears. In this example, during a drive state, an axial load on the first side gear is in an inboard direction. In this way, the position of the lubrication port in the case of the differential allows lubricant to be delivered to a targeted region of the differential which may experience higher loads, thereby decreasing wear on the gearing system and increasing differential longevity.

As one example, the differential case may include a plurality of lubrication ports. In this example, each lubrication port opens radially adjacent to a separate pinion gear in a first set of pinion gears. In this way, the lubrication ports provide more balanced lubricant distribution. Consequently, the potential for uneven wear on the gearing system is decreased which may further increase differential longevity.

As another example, the differential case may comprise a continuous (e.g., monolithic) structure, which may increase the overall strength and reliability of the differential. Further, structuring the case in this manner reduces the overall number of parts of the differential. The differential's manufacturing duration may be decreased, as a result.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 4A-4B are cross-sectional views of the differential, depicted in FIG. 3.

DETAILED DESCRIPTION

The following description relates to a differential system for use in a vehicle. In one example, the differential may be a limited slip differential that allows the deviation of speed between axle shafts to be constrained. The differential case may have lubrication ports that open into targeted regions of the differential to enhance lubricant distribution in areas of the differential assembly that experience higher loads. This lubrication port configuration decreases wear on the gearing system of the differential. Accordingly, the differential's longevity is increased. Because of the inclusion of multiple lubrication ports positioned about the case of the differential, more balanced lubricant distribution may be achieved. This enhanced lubrication distribution decreases the potential for uneven component wear. The differential may further include a split tooth pinion gear configuration. The split tooth pinion gears include asymmetrically arranged toothed and untoothed portions. The asymmetric split mesh pinion gears may allow for more balanced contact pressure between the gears and further decrease tooth wear.

Figure 1:
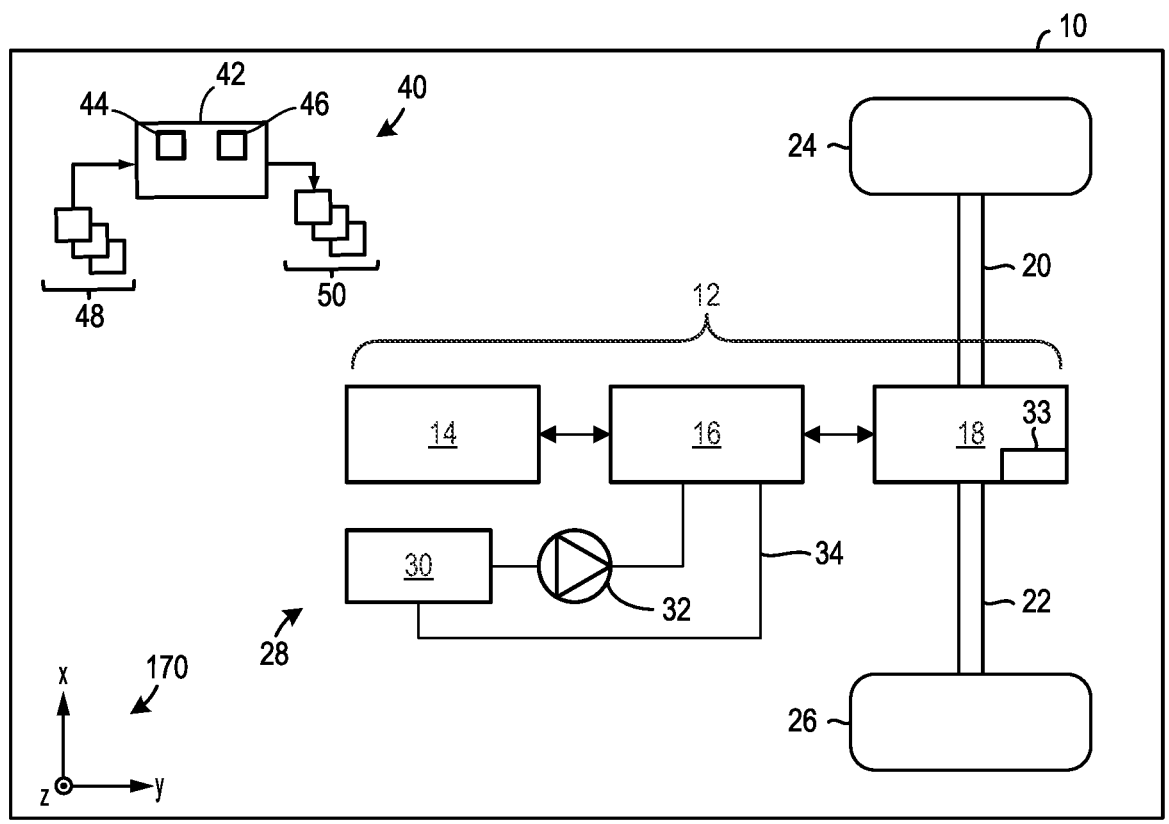
FIG. 1 is a schematic representation of a vehicle powertrain with a differential.
Figure 2:
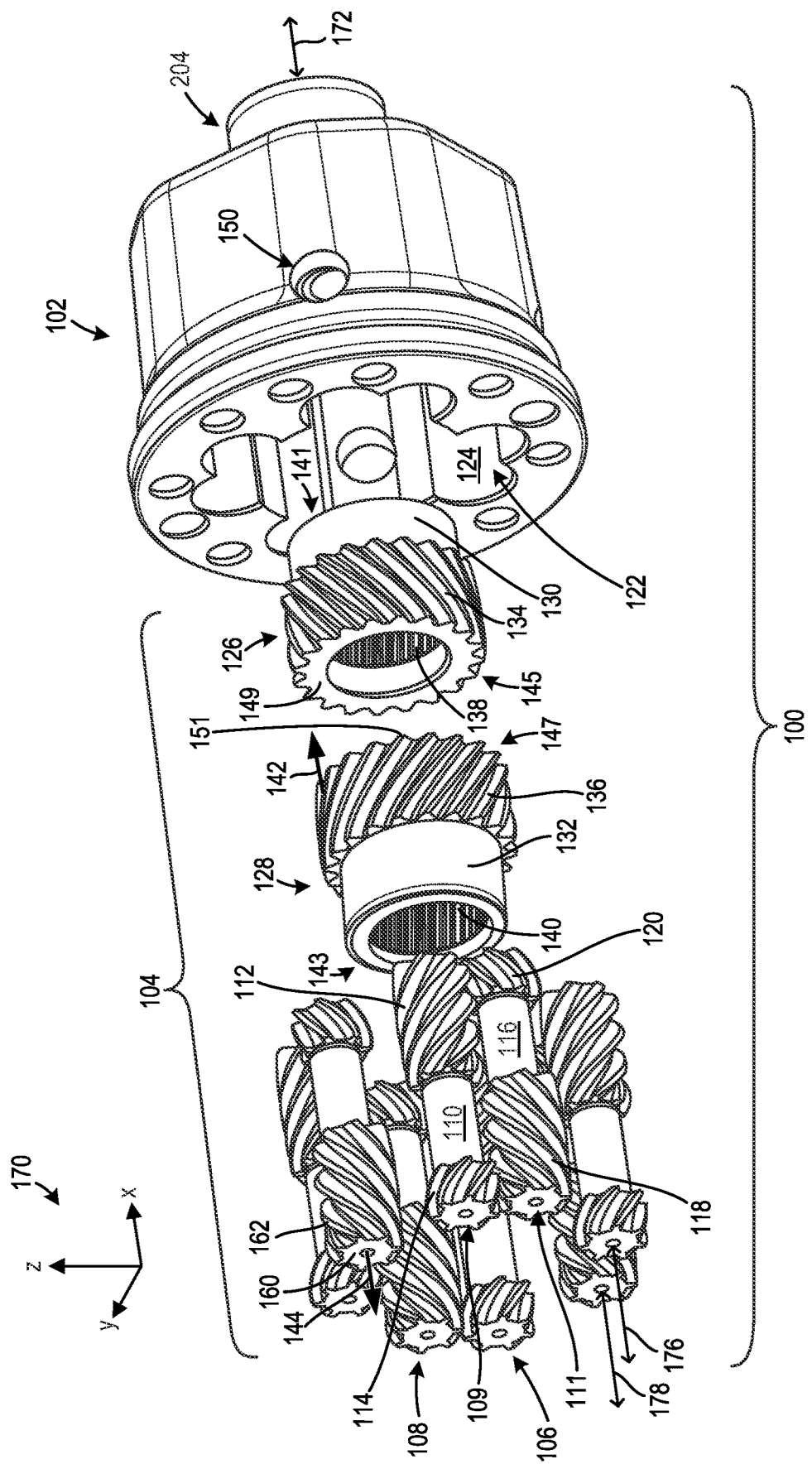
FIG. 2 is an exploded view of a differential according to an example of the present disclosure.
Figure 3:
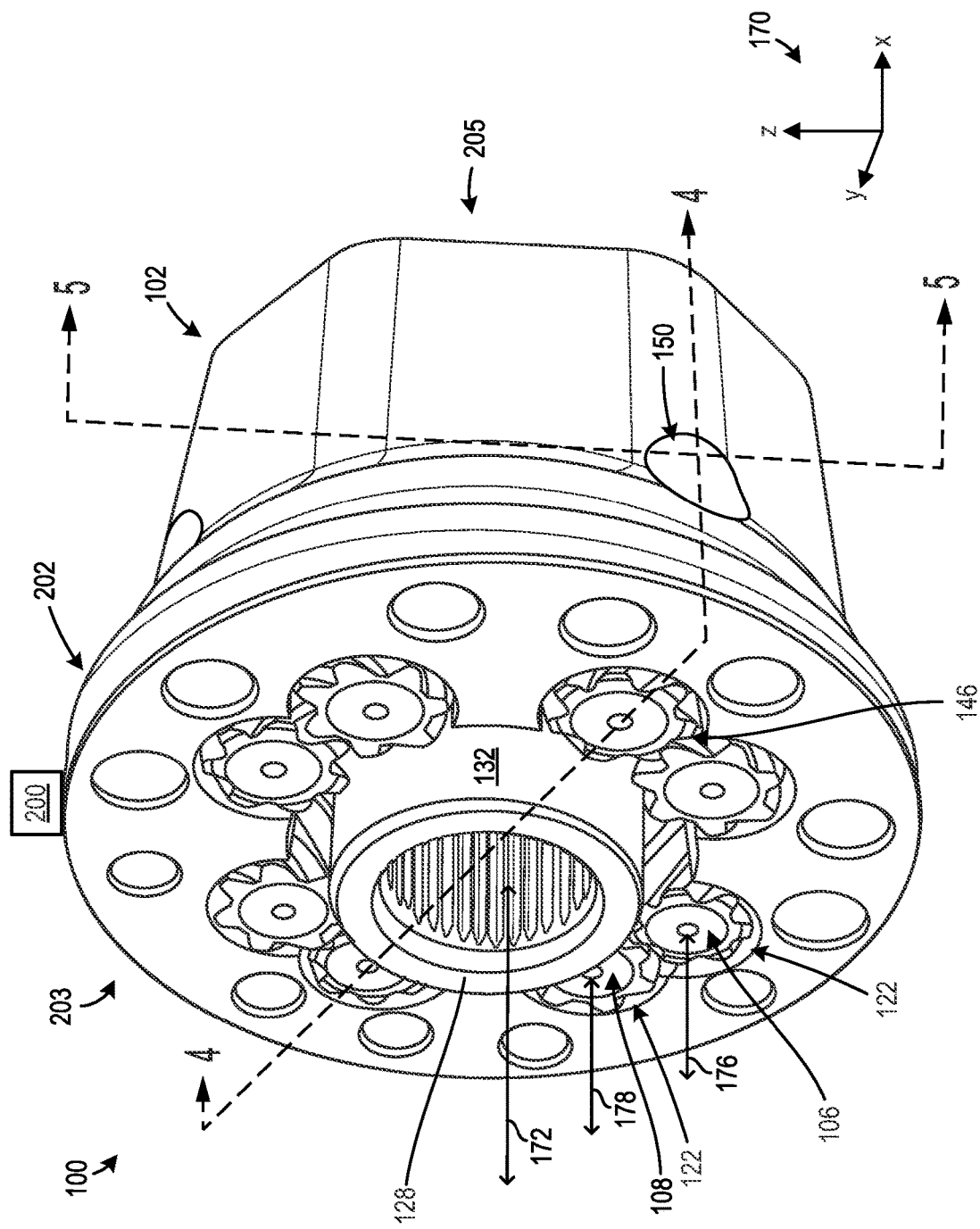
FIG. 3 is a perspective view of the differential, depicted in FIG. 2, in an assembled state.
Figure 5:
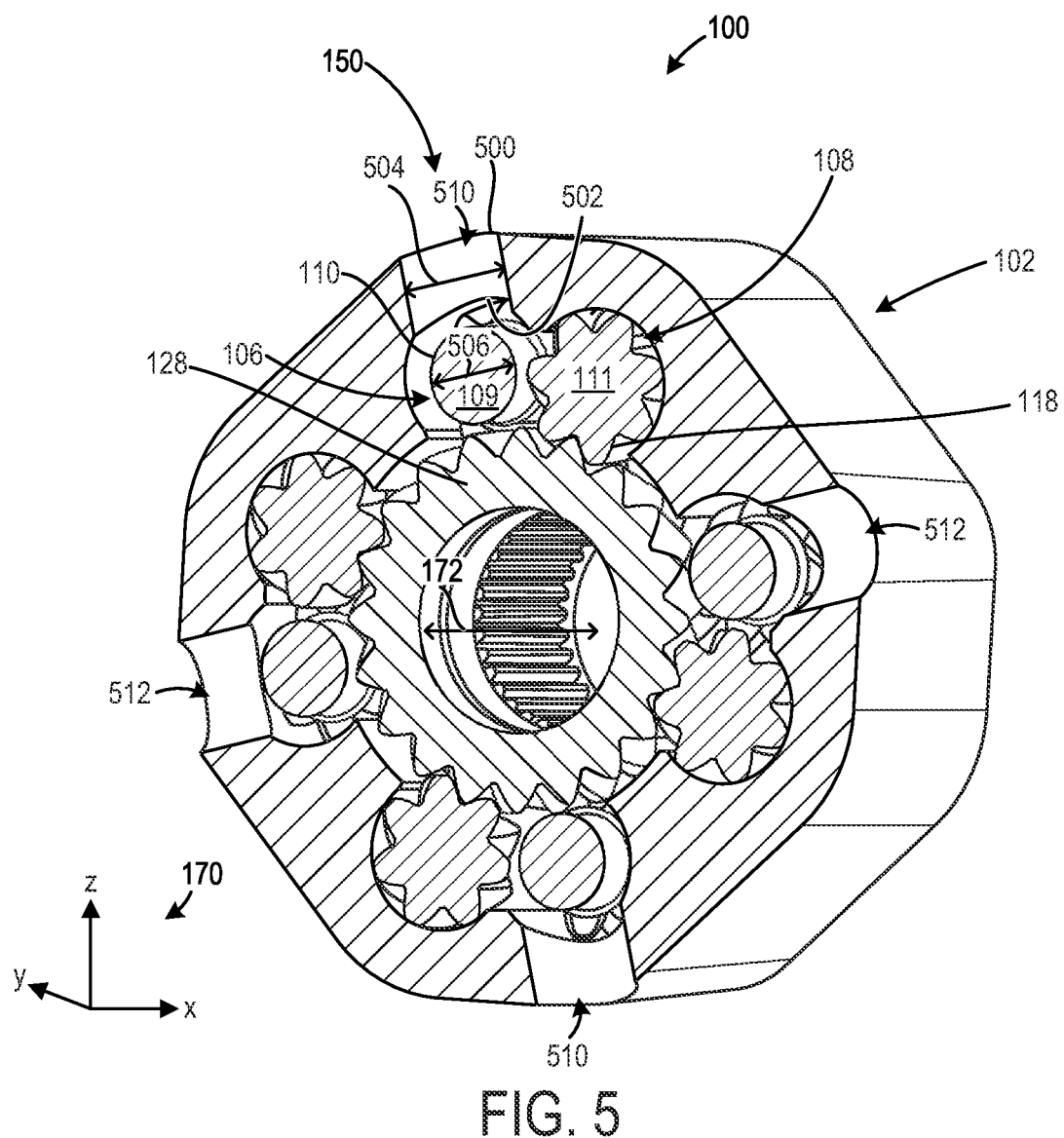
FIG. 5 is a cross-sectional view of the differential, depicted in FIG. 3.
Figure 6A:
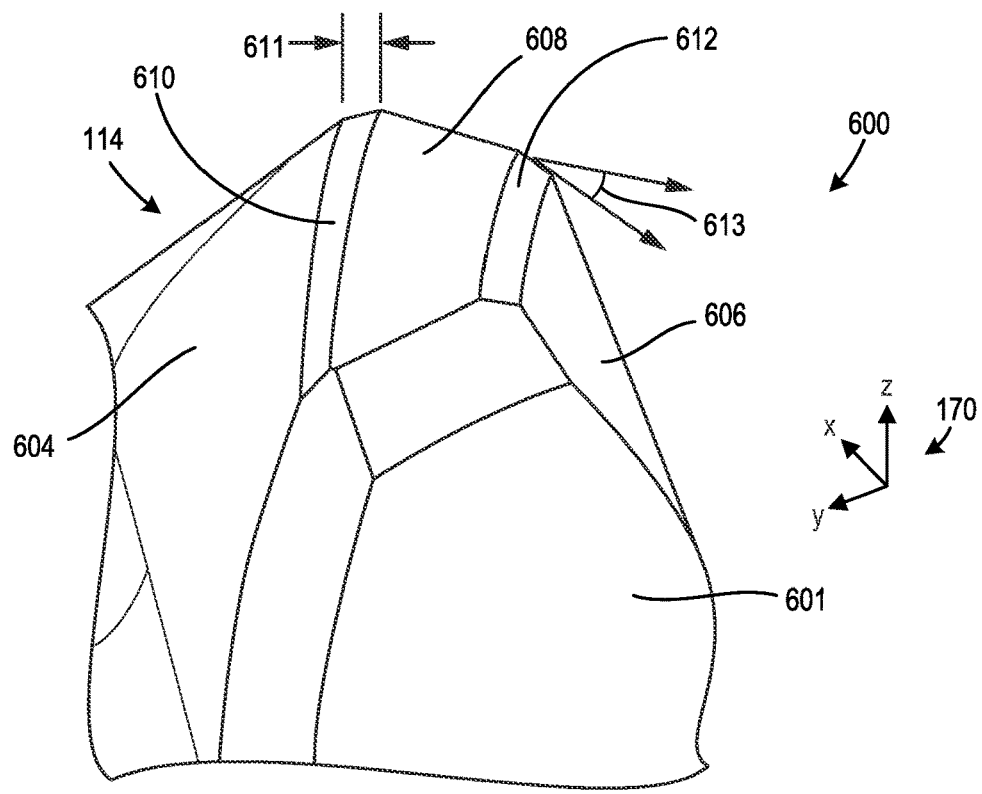
FIGS. 6A-6B are detailed views a pinion gear included in the differential, depicted in FIG. 2.
Figure 6B:
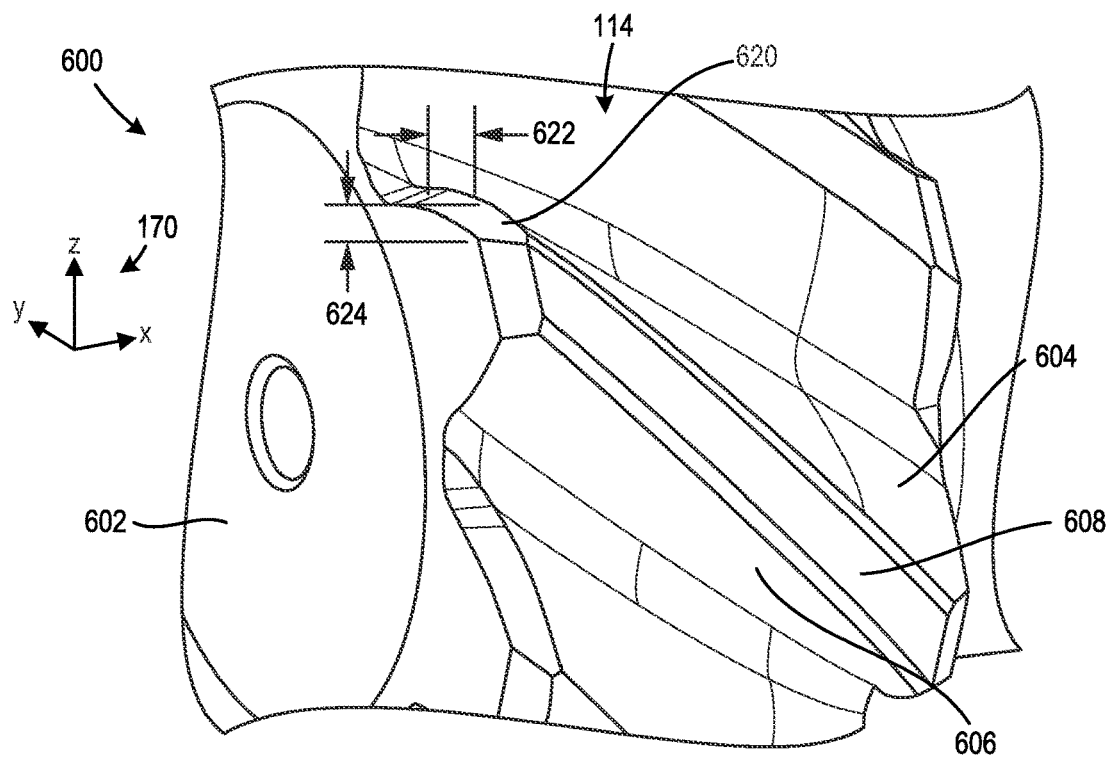

FIG. 1 depicts a vehicle with a drivetrain that includes a differential for limiting rotational speed variance between two drive axles, and a lubrication system for supplying lubricant to the differential to decrease component wear. FIG. 2 depicts a differential with sets of split mesh pinion gears and lubrication ports arranged to provide a more balanced lubricant flow pattern to reduce uneven wear amongst the components to increase the differential's lifespan. FIG. 3 shows the differential with pairs of pinion gears that are arranged symmetrically around the case, which may reduce rotational imbalances within the differential and further reduce differential wear. FIGS. 4A and 4B illustrate different lubricant flow patterns which more efficiently distribute lubricant to higher wear areas when the differential is stationary and rotating, respectively. FIG. 5 depicts the arrangement of gears within the differential case, and particular higher load regions of the gear assembly to which lubricant is routed via the lubrication ports. FIGS. 6A and 6B show the pinion gears with a tooth chamfer geometry designed to further reduce gear wear.

FIG. 1 schematically illustrates a vehicle 10 with a powertrain 12 according the present disclosure. The vehicle may take a variety of forms in different embodiments such as a light, medium, or heavy duty vehicle. To generate power, the powertrain 12 may comprise a motive power source 14. The power source may include an internal combustion engine, electric motor, combinations thereof, or other suitable device designed to generate rotational energy. The internal combustion engine may include conventional components such as cylinder(s), piston(s), valves, a fuel delivery system, an intake system, an exhaust system, etc. Further, the electric motor may include conventional components such as a rotor, a stator, a housing, and the like for generating mechanical power as well as electrical power during a regeneration mode, in some cases. As such, the powertrain may be utilized in a hybrid or electric vehicle (e.g., battery electric vehicle). Therefore, the powertrain may have a parallel, a series, or a series-parallel hybrid configuration, in certain instances. In other examples, however, the vehicle may solely use an internal combustion engine for power generation.

The motive power source 14 may provide mechanical power to the differential 18 via a transmission 16. The power path may continue through the differential 18 to drive wheels 24, 26 by way of axle shafts 20, 22, respectively. As such, the differential 18 distributes rotational driving force, received from transmission 16, to the drive wheels 24, 26 of axle shafts 20, 22, respectively, during certain operating conditions.

The transmission 16 has a gear reduction that provides a speed-torque conversion functionality. To elaborate, the transmission 16 may be a shiftable gearbox, a continuously variable transmission, an infinitely variable transmission, and the like. The transmission may make use of mechanical components such as shafts, gears, bearings and the like to accomplish the aforementioned gear reduction functionality.

The differential 18 is designed to permit speed deviation between the axle shafts during certain conditions, such as cornering. However, to increase vehicle traction, the differential may be a limited slip differential designed to constrain speed deviation between the axle shafts 20, 22, during certain conditions. In particular, when the vehicle is operating in a low traction environment, the drive wheels may experience differing friction coefficients. In these environments, the rotational speed of the left and right drive wheels may vary depending on the friction coefficient. As this speed difference increases, the limited slip differential may increase friction between the pinion gears that mesh with the slipping side gear and the pinion pockets to limit the speed deviation between the drive wheels. Hence, vehicle handling performance may be enhanced when a limited slip differential is utilized. To accomplish this speed constraint functionality, the differential may include a case, sets of pinion gears, and side gears described in greater detail herein with regard to FIGS. 2-6B.

FIG. 1 further shows a lubrication system 28 designed to supply lubricant (e.g., natural and/or synthetic oil) to components of the transmission 16. In one example, to carry out the lubricant distribution, the lubrication system 28 includes a reservoir 30 (e.g., a sump), a pump 32 for driving lubricant flow through the system, a plurality of conduit 34, and/or other suitable lubricant distribution components such as nozzles, valves, jets, and the like. The conduits, in the illustrated example, are routed from the pump 32 to the transmission 16, and from the transmission to the reservoir 30. Additionally, the differential 18 may include an enclosed splash lubrication arrangement. In such an example, as the differential rotates, lubricant may be picked up and distributed to various components of the differential from a sump 33 in the differential. As such, the lubricant in the differential may be self-contained and may not be in fluidic communication with the lubricant conduits in the transmission, in one example. However, in other examples, lubricant may be routed between the transmission and the differential and from the differential to the reservoir. Other lubricant routing schemes have been contemplated, such as conduit arrangements that flow lubricant in parallel through the transmission and the differential.

The vehicle 10 may include a control system 40 with a controller 42. The controller may include a processor 44 and a memory 46 holding instructions stored therein that when executed by the processor cause the controller to perform various methods, control techniques, etc. described herein. The processor may include a microprocessor unit and/or other types of circuits. The memory may include known data and storage mediums such as random access memory, read only memory, keep alive memory, combinations thereof, etc. The memory may further include non-transitory memory.

The control system 40 may receive various signals from sensors 48 positioned in different locations in the vehicle 10 and the powertrain 12. Conversely, the controller may send control signals to various actuators 50 coupled at different locations in the vehicle and powertrain. For example, the controller may send signals to the motive power source 14. Responsive to receiving the command signal, an actuator in the motive power source may adjust output speed or torque. Other controllable components in the vehicle and transmission system may function in a similar manner with regard to receiving command signals and actuator adjustment. For instance, the pump 32 may receive control signals which trigger adjustment of a pump actuator to vary the pump's output flowrate. Further, during a drive mode, the controller may adjust the motive power source to achieve a desired vehicle speed, for instance. Conversely, during a coast mode, the power source may be inactive and power may travel from the wheel to the differential and so forth.

An axis system 170 is provided in FIG. 1 as well as FIG. 2-6B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A central axis 172 of the differential system is further provided in FIG. 2-5, for reference. It will be understood that the central axis 172 may be the rotational axis of the side gears and axle shafts in the differential system. As described herein, axial movement may refer to a component's movement along a direction parallel to the central axis.

FIGS. 2-3 show a differential 100. The differential 100 represents an example of the differential 18, shown in FIG. 1. As such, these differentials may share common structural and functional features. FIG. 2 specifically illustrates an exploded view of the differential 100 while FIG. 3 illustrates an assembled view of the differential 100. Each of the pinion gears in the first set of pinion gears 106 has an axis of rotation 176 and each of the pinion gears in the second set of pinion gears 108 has an axis of rotation 178. The rotational axes 176 and 178, as well as central axis 172 of the differential, are shown to be parallel when the differential is assembled. However, during certain conditions the rotational axes of the pinion gears may not be parallel to the central axis.

Turning specifically to FIG. 2, the differential 100 comprises a case 102 that houses a gear assembly 104. The gear assembly comprises a first set of pinion gears 106 and a second set of pinion gears 108. Each of the first and second sets of pinion gears 106, 108, includes a plurality of pinion gears 109, 111, respectively. The first and second sets of pinion gears 106, 108 may include an even number of gears to reduce rotational imbalances and differential wear. However, the sets of pinion gears may include an odd number of gears, in other embodiments, which may increase rotational imbalances.

The pinion gears in each of the sets 106, 108 may have asymmetrically arranged toothed and untoothed sections. Specifically, in one example, each pinion gear in the gear sets may have a similar size and tooth pattern as the pinion gears in the first set. Further, the gears in each set have an opposite arrangement with regard to the axial ends of the gears. In this way, each set of pinion gears has a common split toothed arrangement but are oppositely oriented to mesh with different side gears 126, 128. Such an arrangement, having asymmetrically toothed first and second sets of meshing pinion gears, may provide more even contact pressure. As a result, tooth wear is decreased and differential longevity is increased.

Each of the pinion gears 109 in the first set of pinion gears 106 therefore includes an untoothed section 110 positioned between a wider toothed section 112 and a narrower toothed section 114. As such, the gears may have a wider toothed section and a narrowed toothed section on opposing axial sides. Likewise, each of the pinion gears 111 of the second set of pinion gears 108 includes an untoothed section 116 positioned between a wider toothed section 118 and a narrower toothed section 120. Further, the untoothed sections of the gears have a smaller diameter than the outer diameter of the toothed sections, to avoid undesired interaction between the pinion gears and the side gears.

Each pair of adjacent gears 109, 111 are arranged so that the narrower toothed sections 114, 120 mesh with the wider toothed sections 112, 118 of the opposing gear, which may more evenly balance contact pressure. Further, the untoothed sections 110, 116 of the first set of pinion gears axially span the second side gear, and the second untoothed sections of the second set of pinion gears axially span the first side gear. In this way, undesired interaction between the first set of pinion gears and the second side gear as well as the second pinion gear set and the first side gear can be avoided.

The pinion gears of the first and second sets of pinion gears 106, 108 may be arranged in an alternating pattern in corresponding recesses 122 (e.g., pockets) of the case. To elaborate, the recesses 122 may be shaped to house pairs of pinion gears formed between the first and second pinion gear sets. As such, the recesses may have adjacent partially cylindrical faces 124 sized to receive these gear pairs. Specifically, in each gear pair, the narrower toothed sections mesh with the wider toothed sections, when assembled.

The gear assembly 104 further includes the first side gear 126 that meshes with the wider toothed sections 112 of the gears in the first pinion gear set 106. Likewise, the second side gear 128 in the gear assembly 104 meshes with the wider toothed sections 118 of the second pinion gear set 108. As illustrated, the first and second side gears 126, 128 include exterior untoothed sections 130, 132 arranged outboard from exterior toothed sections 134, 136, respectively. The untoothed sections of the side gears may allow the side gears' structural integrity to be increased. Further, the untoothed side gear sections may facilitate a stronger attachment between the side gears and axle shafts by extending the axial lengths of the splines, if desired. However, in alternate examples, the side gears may not include the untoothed sections.

The side gears 126, 128 may further include interior splines 138, 140 profiled to mate with axle shafts which may increase assembly efficiency during manufacturing and repair. However, additional or alternate attachment techniques may be used to couple the axle shafts to the side gears such as bolts, welds, press fitting, and the like.

The untoothed sections 130, 132 of the side gears may extend to outboard axial sides 141, 143 of the gears. Conversely, the toothed sections 134, 136 may extend to inboard sides 145, 147 of the side gears. The inboard sides 145, 147 have contact surfaces 149, 151, respectively, which may be perpendicular to the central axis 172, whose surface area is increased (e.g., maximized) to allow the gear withstand greater loading. The differential's applicability may consequently be expanded across a wider range of vehicle platforms, if desired.

The differential 100 may generate a limiting force to constrain the relative rotational speed of the side gears 126, 128 via friction exhibited between the pinion gears and the case. To expound, the first and second sets of pinion gears 106, 108 and the first and second side gears 126, 128 may be formed as generally cylindrical helical gears. As such, the meshing forces between the first set of pinion gears 106 and the first side gear 126, and between the second set of pinion gears 108 and the second side gear 128, generate meshing reaction forces in axial and radial directions in both drive and coast/reverse modes of operation. The axial force components generate a frictional force between end surfaces 160 of the pinion gears 109, 111 and the differential case 102. Likewise, the radial force components generate a frictional force between the tooth surfaces 162 of the pinion gears 109, 111 and the pinion pockets in the differential case, thereby limiting axle shaft speed variance permitted by the differential 100. In other words, the differential may transfer more torque to the side gear whose associated drive wheel has less traction.

During drive operation, the mechanical power path may travel from upstream components to the differential case 102, via an input gear (e.g., ring gear). Next, the case transfers power to each set of pinion gears 106, 108. The first set of pinion gears 106 then transfers power to the first side gear 126 and the second set of pinion gears 108 transfers power to the second side gear 128. From the side gears, power may travel through associated axle shafts to the drive wheels. Conversely, during coast operation, the power path is reversed.

Further, during drive operation, the axial thrust load on the second side gear 128 may be in an inboard direction 142. In this regard, inboard refers to a direction extending toward a center (e.g., radially oriented central plane) of the differential and outboard conversely indicates a direction extending away from the center. Specifically, this central plane may radially extend between contact surfaces 149, 151. In some cases, a cover may be attached via fasteners to the differential case 102 to enclose the gear assembly 104. When the differential is designed with an inboard load on the side gear, undesired loading of fasteners that attach a cover, discussed in greater detail herein with regard to FIG. 3, to the case 102 may be reduced. Correspondingly, the axial loads on the second set of pinion gears 108 may be in directions that extend outboard away from the wider toothed sections 116, as indicated by arrow 144.

FIG. 3 shows an assembled view of the differential 100 with the gear assembly 104 at least partially enclosed in the case 102. In one example, the case 102 may have a continuous (e.g., monolithic) structure. By forming the case in this manner, the overall strength and reliability of the differential may be enhanced due to the elimination of fasteners that are used to connect multiple case components (e.g., two case halves). Further, designing the differential assembly with a monolithic case may allow for a reduction in the overall number of parts, a reduction in assembly time, and/or the simplification of part manufacture to be realized. The case 102 may include a surface hardened material. For instance, the case may be constructed out of a carburized material, such as steel. Carburizing is a treatment process where metal is heated with charcoal, carbon monoxide, or another suitable carbon source. In other instances, the case may be hardened via a nitriding process, diffusing nitrogen into the surface of a metal case, or a ferritic nitrocarburizing process, diffusing nitrogen and carbon into the surface. In one specific example, the metal case may be carburized to attain a hardness that is greater than or equal to 80 Rockwell hardness measured on the A scale (HRA). Hardening of the case in this manner allows the case to resist surface degradation (e.g., abrasion) more effectively, thereby enhancing wear resistance and increasing the longevity of the case and differential as a whole.

The first and second sets of pinion gears 106, 108 are again illustrated in FIG. 3. Specifically, the pairs of gears formed between gears in the different pinion gear sets and positioned within the recesses 122 in the case 102 are shown. The recesses 122 of case 102 may have a relatively smooth surface. For instance, the surface finish of the pinion pockets may be less than or equal to 60 microns (μm). Providing internal recesses 122 within this surface finish range reduces surface friction. In particular, when lubricant is introduced into the interior of case 102 of the differential 100, and thus into recesses 122, the surface finish of the recesses may reduce the likelihood of excessive reduction of the viscosity of the lubricant. Hence, undesirable increases in friction and wear within the case 102 may be avoided to further increase the longevity of the differential 100. However, the surface finish of the case may be greater than 60 μm, which may, however, increase surface abrasion.

The recesses 122 and gears housed therein, correspondingly, may be symmetrically arranged within the case 102 with regard to the central axis 172. Because of the symmetric gear arrangement, more balanced load distribution in the differential may be achieved. Nonetheless, asymmetric gear arrangements have been envisioned.

It will be understood that a case cover and an input gear (e.g., ring gear) may be coupled to the case 102. Further, the differential may be enclosed in a housing containing lubricant, such that rotation of the differential by the input gear may splash lubricant within the housing. The case may include ports to enable the flow of lubricant in the housing to be directed to and from the case to lubricate various gear components contained therein, as described herein with reference to FIGS. 4A-4B. The cover may be attached to a first side 203 (e.g., left side in the frame of reference of FIGS. 2-3) of the case 102 opposite to a second side 205 (e.g., right side in the frame of reference of FIGS. 2-3) which may include the axle shaft sleeve 204. The cover allows for further enclosure of the pinions. The input gear 200, which is schematically depicted in FIG. 3, may be directly attached to an extension 202 in the case 102. As illustrated, the extension 202 is positioned on the first side 203 of the case, although other positions have been contemplated.

The interfaces 146 where the narrower toothed sections 114 of the pinion gears 109 in the first set mesh with the wider toothed sections 118 of the pinion gears 111 in the second set are further shown in FIG. 3. Thus, the first and second sets of pinion gears 106, 108 form multiple pairs of meshing pinion gears. Further, the interfaces 146 between the narrower toothed sections of the pinion gears 109 and the wider toothed sections 118 of the pinion gears 111 may be positioned radially outward from the untoothed section of the side gear 128. This gear layout avoids undesired interaction between the pinion and side gears. Further, positioning the pinion gears in this manner enables the diameter of the axle shafts to be increased, if wanted, when compared to differential designs which have pinion gears radially overlapping the side gears.

The case 102 may further comprise a plurality of lubrication ports 150, shown in FIGS. 2 and 3, that opens radially adjacent to one of the pinion gears in the first set of pinion gears 106. In one example, the lubrication ports 150 each open radially adjacent to a separate one of the pinion gears 109 in the first pinion gear set. In particular, the lubrication ports may open adjacent to portions of the untoothed sections 110 of pinion gears in the first set of pinion gears 106. In some examples, the case 102 may not include lubrication ports adjacent to the second untoothed sections of the pinion gears in the second set of pinion gears. In this manner, lubricant may be distributed to selected regions of the differential assembly that experience higher loads, during certain conditions. As a result, component wear is decreased and differential longevity is increased. Further, such a configuration may provide more balanced lubricant distribution within the case of the differential, thereby decreasing the potential for uneven component wear.

FIGS. 4A and 4B provide cross-sectional views of the differential 100 of FIG. 3. Each cross-sectional view, as shown in FIGS. 4A and 4B, is defined by a lateral cut taken along a dashed line 4-4 of the assembled differential 100 of FIG. 3. The lateral cut plane may pass through the first set of pinion gears 106, the side gears 126, 128, and two lubrication ports of the plurality of lubrication ports 150, such that the lateral cut divides the differential 100 into two equal parts. FIGS. 4A and 4B are described herein collectively.

The cross-sectional views of FIGS. 4A and 4B illustrate the differential case 102, the first set of pinion gears 106, and the side gears 126, 128. The second set of pinion gears 108, shown in FIGS. 2-3, are obscured from view in FIGS. 4A and 4B. However, as indicated above, the first and second sets of pinion gears mesh with one another and the first and second side gears 126, 128 respectively.

Pairs of pinion gears, from the first and second sets are arranged in the recesses 122 (e.g., pinion pockets) throughout differential case 102. Specifically, as shown in FIGS. 4A-B, the first set of pinion gears 106 are oriented so that the wider toothed portions 112 are located at the right side of the case, so as to mesh with the exterior toothed section 134 of the first side gear 126.

Further, the untoothed sections 110 of the gears 109 in the first set may have a length sufficient to axially span the exterior toothed section 136 of the second side gear 128. The narrower toothed sections 114 of the first set of pinion gears, located opposite the wider toothed sections 112, may be positioned adjacent the exterior untoothed section 132 of the second side gear 128.

Similarly, the second set of pinion gears are oriented so that the second wider toothed sections are positioned at the left side of the case 102, so as to mesh with the exterior toothed section 136 of the second side gear 128. Further, the untoothed sections of the second set of pinion gears may have a length sufficient to axially span the exterior toothed section 134 of the first side gear 126. Still further, the narrower toothed sections of the second set of pinion gears may be positioned adjacent the exterior untoothed section 130 of the first side gear 126, so that the second set of pinion gears 108 and the first side gear 126 do not directly interact. This orientation of the first and second sets of pinion gears, allows meshing of each pair of pinion gears arranged within case 102. Specifically, the wider toothed sections 112 of the gears 109 mesh with the narrower toothed sections of the second set of pinion gears. Conversely, narrower toothed sections 114 of the gears 109 mesh with the wider toothed sections of the second set of pinion gears.

FIGS. 4A and 4B illustrate the flow of lubricant through a case of a differential according to the present disclosure. In the lubrication system arrangement shown in FIGS. 4A and 4B, a first lubrication port 152 is located at an upper side of the case and a second lubrication port 154 located at a lower side of the case. Further, the lubrication ports 150 each open radially adjacent the untoothed section 110 of a separate pinion gear in the first set of pinion gears 106. Accordingly, the lubrication ports may be symmetrically arranged around the differential case 102 in relation to planes that extend through the central axis 172, in order to distribute lubricant in a more effective manner. Likewise, the first set of pinion gears 106 may be symmetrically arranged within case 102. However, other arrangements of lubrication ports have been envisioned.

When the differential case 102 is stationary, as shown in FIG. 4A, lubricant may flow downwardly, due to gravity, through the case. As such, the lubricant in the case may not be pressurized via pumps or other lubrication system components. Hence, while the case is stationary, lubricant may enter the case 102 through the upper lubrication port 152, as indicated by arrow 400. The lubricant then flows downwardly into the case 102. In the case, lubricant is distributed from the untoothed sections 110 of the gears 109 to the wider toothed portions of the gears in the second set. Next, lubricant may flow around the second side gear 128 and the interfaces formed between the gears in the second set and the second side gear. Finally, lubricant travels through a lower pair of recesses and out of the lower lubrication port 154, indicated via arrow 402. In this manner, lubricant may be distributed to a significant portion of the gearing system of the differential.

When the differential case 102 is rotating, as shown in FIG. 4B, centrifugal forces cause lubrication to flow out of the differential case 102 through the plurality of lubrication ports 150, as indicated by arrows 404, 406. In other words, as the case rotates, the lubricant flows radially outward through each of the plurality of lubrication ports 150. Specifically, as differential case 102 rotates, the pairs of pinion gears 106, 108 in corresponding recesses 122 also revolve with the case, and lubricant may be routed throughout the interior of case 102 as it exits the case. In this way, lubricant is provided to the interfaces between gears 109, 111 and first and second side gears 126, 128, respectively, as well as the interior surfaces of case 102.

FIG. 5 shows another cross-sectional view of the differential 100. The cross-sectional view, as shown in FIG. 5, is defined by an axial cut taken along a dashed line 5-5 of the differential 100 of FIG. 3, in order to show an interior of the assembled differential. The axial cut plane may pass through the plurality of lubrication ports 150, the second side gear 128, and the first and second sets of pinion gears 106, 108.

FIG. 5 illustrates the differential case 102, the first and second sets of pinion gears 106, 108, the second side gear 128, and the plurality of lubrication ports 150. The lubrication ports 150 in the case 102 open adjacent the untoothed section 110 of a pinion gear in the first set of pinion gears 106. Each lubrication port may be radially aligned and positioned outward from an untoothed section of one of the pinion gears 109. As such, each lubrication port may extend from an exterior surface 500 of the case to an interior surface 502 that forms a portion of a pinion pocket that houses the associated pinion. However, as illustrated, the pinion pocket of the adjacent gear in the second set does not include a lubrication port. Put another way, the pockets for the pinion gears in the second set may have an uninterrupted circumferential surface. In this way, lubricant may be strategically directed to the untoothed sections of the gears in the first set to enhance lubricant distribution. Alternatively, the case may include ports adjacent to the gears in the second set, which may however increase lubricant flow imbalances and decrease the case's structural integrity.

To reduce flow restriction, each lubrication port of the plurality of lubrication ports 150 may, in one example, have a diameter 504 that is substantially constant along the length (e.g., axial length) of the port. However, in an alternate example, the diameter of each lubrication port may taper along the axial length of the port to provide a more targeted lubrication flow through each port. Further, in certain instances, the diameter 504 of each lubrication port may be greater than a diameter 506 of the untoothed section 110, to increase lubrication flow around the gears 109. However, lubrication ports with other profiles may be used in other examples, which may alter the lubricant distribution pattern.

The plurality of lubrication ports 150 may be conceptually divided into two pairs that are positioned on opposing sides of the case 102. Arranging the ports in this manner allows at least one of the ports to remain in an upper quadrant and one to remain in a lower quadrant when the case is stationary. Consequently, the rotational position of the case may not impede the gravity driven lubrication flow through the case. In other examples, the case may include only one pair of lubrication ports, which may impact flow dynamics, or more than two pairs of ports which may decrease the case's structural integrity, for instance.

FIG. 5 further illustrates the meshing of the second side gear 128 with the second set of pinion gears 108. More particularly, the teeth of the second side gear mesh with the wider toothed portions 118 of gears 111. In this assembled configuration, the teeth of the second side gear 128 are positioned adjacent the untoothed sections 110 of the gears 109. Accordingly, the untoothed sections 110 of the gears 109 may axially span the second side gear 128.

FIGS. 6A and 6B show detailed views of chamfered edges of toothed sections of an example pinion gear 600 in the first set of pinion gears 106, depicted in FIGS. 1-5. Since the pinion gears in both of the first and second sets of pinion gears may have a similar size and geometry, the gear tooth geometry illustrated in FIGS. 6A and 6B may be applicable to either of the first and second sets of pinion gears.

FIG. 6A illustrates the narrower toothed section 114 of the example pinion gear 600 with a plurality of teeth. The narrower toothed section 114 of the pinion gear 600 includes an end face 601. When assembled in the differential, the end face 601 is adjacent to the wider toothed sections of the gears in the second set. Each tooth of the pinion gear 600 includes a drive side (e.g., convex flank) 604 and a coast side (e.g., concave flank) 606 joined by a top land 608.

Each tooth in the pinion gear 600 may additionally include a chamfer 610 between the drive side 604 and the top land 608. The chamfer 610 may have a width 611, which may be between 0.45 millimeters (mm) and 0.25 mm. In other examples, the width 611 of chamfer 610 may be outside of such a range (e.g., having a width of greater than 0.45 mm or less than 0.25 mm). The tooth may further include a chamfer 612 between the top land 608 and the coast side 606. The chamfer 612 may have an angle 613, as indicated in FIG. 6A, which may be between 15° and 20°. Thus, the angle may therefore be measured between planar surfaces of the top land and the chamfer that intersect one another. Designing teeth which are chamfered in this range may decrease gear wear which further increases the differential's lifespan. In other examples, the angle 613 of the chamfer 612 may be outside the aforementioned range (e.g., greater than 20° or less than 15°).

FIG. 6B illustrates the narrower toothed section 114 of the pinion gear 600 with teeth that have the drive side 604, coast side 606, and top land 608. An end face 602 of the pinion gear 600 is shown in FIG. 6B. With reference to FIG. 2, the end face 602 may be a left end face.

Turning back to FIG. 6B, the pinion gear 600 includes a chamfer 620 between the end face 602 and the drive side 604. The chamfer 620 has a width 622 and a length 624. The width 622 of chamfer 620 may be between 0.70 mm and 0.30 mm, in one example. Further, in certain instances, the length 624 of chamfer 620 may be between 0.80 mm and 0.40 mm. A chamfer 620 designed within the aforementioned ranges may be small enough to provide a larger contact area between top land 608 and a corresponding pinion pocket, when the pinion gears are assembled within the case. Further, the chamfer 620 may be sized to reduce the chance of the chamfer diminishing or reducing through the lifespan of the pinion gear. An angle measured between planar surfaces of the top land 608 and the chamfer 620, as determined by the width 622 and length 624, may be as small as possible while still allowing for the accumulation of debris and/or burrs from surface wear, in one example. In this way, excessive friction due to buildup of debris between the pinion gears and pinion pockets is avoid, thereby reducing wear on the gearing system. However, in other examples, chamfer 620 may have a different angle, length, and/or width outside of the aforementioned ranges.

FIGS. 2-6B are drawn approximately to scale. However, other relative component dimension may be used, in other embodiments.

FIGS. 1-6B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a differential is provided that comprises a first set of pinion gears with each gear including a first untoothed section positioned between a first wider toothed section and a first narrower toothed section; a first side gear meshing with the first wider toothed sections; a second set of pinion gears with each gear including a second untoothed section positioned between a second wider toothed section and a second narrower toothed section; a second side gear meshing with the second wider toothed sections; a case at least partially enclosing the first and second sets of pinion gears and including a lubrication port that opens radially adjacent to one of the pinion gears in the first set of pinion gears; wherein, during a drive state, an axial load on the second side gear is in an inboard direction.

In another aspect, a limited slip differential is provided that comprises a first set of pinion gears with asymmetrically arranged toothed and untoothed sections; a second set of pinion gears with asymmetrically arranged toothed and untoothed sections, wherein a portion of the toothed sections in the first and second set of pinion gears mesh with each other; a first side gear meshing with a portion of the toothed sections in the first set of pinion gears; a second side gear meshing with a portion of the toothed sections in the second set of pinion gears; and a monolithic case at least partially enclosing the first and second sets of pinion gears and including a plurality of lubrication ports that each open radially adjacent to the untoothed sections of the first set of pinion gears; wherein, during a drive state, an axial load on the second side gear is in an inboard direction and axial loads on the second set of pinion gears are in directions extending outboard away from the second narrowed toothed sections.

In any of the aspects or combinations of the aspects, the lubrication port may be included in a plurality of lubrication ports in the case and wherein each lubrication port in the plurality of lubrication ports may open adjacent to a separate pinion gear included in the first set of pinion gears.

In any of the aspects or combinations of the aspects, the case may not include lubrication ports adjacent to the second untoothed sections of the pinion gears in the second set of pinion gears.

In any of the aspects or combinations of the aspects, the plurality of lubrication ports may open adjacent to the untoothed sections of the pinion gears in the first set of pinion gears.

In any of the aspects or combinations of the aspects, each lubrication port of the plurality of lubrication ports opens adjacent to the first untoothed section of the respective pinion gear in the first set of pinion gears.

In any of the aspects or combinations of the aspects, during the drive state, axial loads on the first set of pinion gears may be in directions that extend outboard away from the first wider toothed sections.

In any of the aspects or combinations of the aspects, during a stationary state, lubricant may flow inward through an upper lubrication port in the plurality of lubrication ports and outward through a lower lubrication port in the plurality of lubrication ports.

In any of the aspects or combinations of the aspects, during drive operation, lubricant may flow radially outward through the plurality of lubrication ports.

In any of the aspects or combinations of the aspects, the first narrower toothed sections may mesh with the second wider toothed sections; and the second narrower toothed sections may mesh with the first wider toothed sections.

In any of the aspects or combinations of the aspects, the case may form a continuous structure.

In any of the aspects or combinations of the aspects, the first and second narrower toothed sections may be chamfered, wherein an angle of the chamfer is between 15° and 20°.

In any of the aspects or combinations of the aspects, the case may be carburized.

In any of the aspects or combinations of the aspects, the first narrower toothed sections may include an outer axial side that is chamfered.

In any of the aspects or combinations of the aspects, during the drive state, axial loads on the second set of pinion gears may be in directions that extend outboard away from the second narrower toothed sections; and the first narrower toothed sections of the first set of pinion gears through which lubricant flow are arranged adjacent to the second wider toothed sections of the second set of pinion gears.

In any of the aspects or combinations of the aspects, the first narrower toothed sections may include chamfers on axial ends of the teeth.

In any of the aspects or combinations of the aspects, during a stationary state, lubricant flow through the plurality of lubrication ports may be gravity driven.

In any of the aspects or combinations of the aspects, during a drive state, lubricant flow through the plurality of lubrication ports may be centrifugally driven.

In any of the aspects or combinations of the aspects, the plurality of lubrication ports may include two lubrication ports positioned on opposing sides of the case.

In any of the aspects or combinations of the aspects, the untoothed sections in the first set of pinion gears may axially span the second side gear and the untoothed sections in the second set of pinion gears may axially span the first side gear.

In any of the aspects or combinations of the aspects, an axial load on the first side gear may be in an inboard direction and axial loads on the first set of pinion gears may be in directions extending outboard away from the first wider toothed sections.

In any of the aspects or combinations of the aspects, internal recesses in the case that enclose the first and second sets of pinion gears may have a surface finish less than or equal to 60 microns (μm).

In any of the aspects or combinations of the aspects, the case may be carburized and has a hardness that is greater than or equal to 80 Rockwell hardness on the A scale (HRA).

In any of the aspects or combinations of the aspects, wherein a width of the chamfer may be between 0.45 and 0.25 millimeters (mm).

In any of the aspects or combinations of the aspects, a width of the chamfer of the first narrower toothed sections may be between 0.70 millimeters (mm) and 0.30 mm and a length of the chamfer of the first narrower toothed sections may be between 0.80 mm and 0.40 mm.

In another representation, a limited slip differential is provided that comprises: two sets of asymmetric split pinion gears that mesh with one another and corresponding side gears; and a plurality of open lubrication holes that are arranged symmetrically with regard to radially alignment and adjacent the untoothed portion of only one of the sets of gears.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

As used herein, the term "approximately" and "substantially" are construed to mean plus or minus five percent of the range unless otherwise specified.

It will be appreciated that the configurations and routines disclosed herein are exemplary in nature, and that these specific embodiments are not to be considered in a limiting sense, because numerous variations are possible. For example, the above technology can be applied to a variety of vehicles such as vehicles with hybrid electric powertrains, combustion engine powertrains, electric powertrains, and the like. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A differential comprising:
a first pinion gear including a first untoothed section positioned between a first wider toothed section and a first narrower toothed section;
a first side gear meshing with the first wider toothed section;
a second pinion gear including a second untoothed section positioned between a second wider toothed section and a second narrower toothed section;
a second side gear meshing with the second wider toothed section; and
a case at least partially enclosing the first and second pinion gears and including a plurality of lubrication ports;
wherein a first lubrication port included in the plurality of lubrication ports opens radially adjacent to the first untoothed section of the first pinion gear.

2. The differential of claim 1, wherein, during a drive state, a thrust load on the second side gear is in an inboard direction.

3. The differential of claim 2, wherein, during the drive state, a thrust load on the second pinion gear is in an outboard direction.

4. The differential of claim 1, wherein the plurality of lubrication ports include a second lubrication port and wherein the first and second lubrication ports are positioned on opposing sides of the case.

5. The differential of claim 4, wherein the second lubrication port opens radially adjacent to a third pinion gear.

6. The differential of claim 1, wherein the case forms a continuous structure.

7. The differential of claim 1, wherein the differential is configured to couple to a transmission.

8. The differential of claim 1, wherein lubricant in the case is not pressurized via a pump.

9. The differential of claim 1, wherein the case is constructed out of a surface hardened material.

10. The differential of claim 9, wherein the surface hardened material is carburized steel.

11. The differential of claim 1, wherein a diameter of the first lubrication port is greater than a diameter of the first untoothed section.

12. The differential of claim 1, wherein the plurality of lubrication ports are radially aligned.

13. The differential of claim 1, wherein the first and second pinion gears each include a plurality of teeth with a top land chamfer.

14. A limited slip differential comprising:
a first pinion gear with asymmetrically arranged toothed and untoothed sections;
a second pinion gear with asymmetrically arranged toothed and untoothed sections, wherein a portion of the toothed sections in the first and second pinion gears mesh with each other;
a first side gear meshing with a portion of the toothed sections in the first pinion gear;
a second side gear meshing with a portion of the toothed section in the second pinion gear; and
a case at least partially enclosing the first and second pinion gears and including a plurality of lubrication ports that each open radially adjacent to the untoothed sections of the first pinion gear;
wherein, during a drive state, an axial load on the second side gear is in an inboard direction and axial loads on the second pinion gear is in a direction extending outboard away from a narrowed toothed section.

15. The limited slip differential of claim 14, wherein the case forms a monolithic structure.

16. The limited slip differential of claim 14, wherein the first and second side gears include splines profiled to attach to axle shafts.

17. The limited slip differential of claim 14, wherein:
during a first state, lubricant flow through the plurality of lubrication ports is gravity driven; and
during a second state, lubricant flow through the plurality of lubrication ports is centrifugally driven.

18. The limited slip differential of claim 14, wherein the first and second pinion gears each include a plurality of chamfered teeth.

* * * * *